Jan. 20, 1925.
O. IRVIN
CAR DUMPING DEVICE
Filed May 21, 1923
1,523,968
3 Sheets-Sheet 2
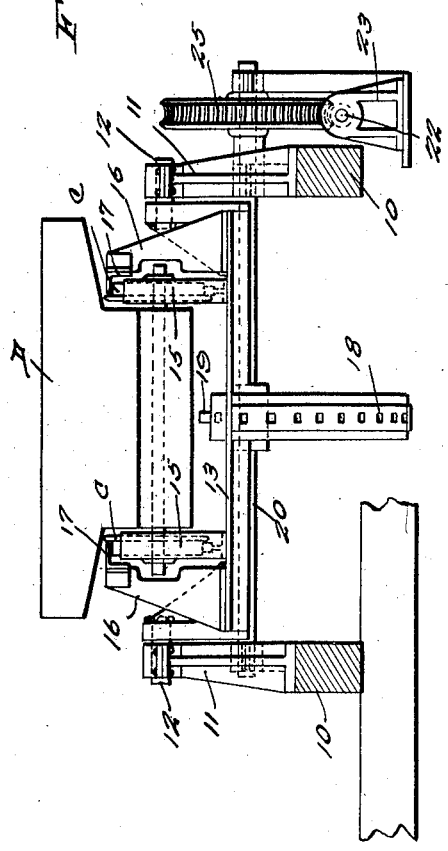
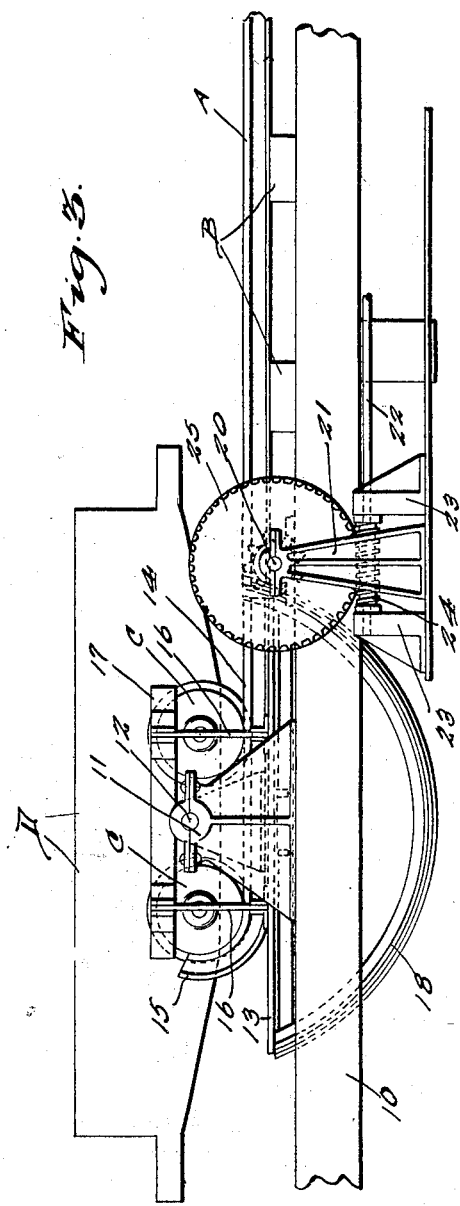
Oran Irvin INVENTOR
BY Victor J. Evans ATTORNEY Jan. 20, 1925.
O. IRVIN
1,523,968
CAR DUMPING DEVICE
Filed May 21, 1923     3 Sheets-Sheet 3
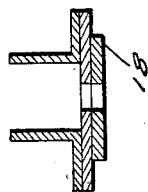
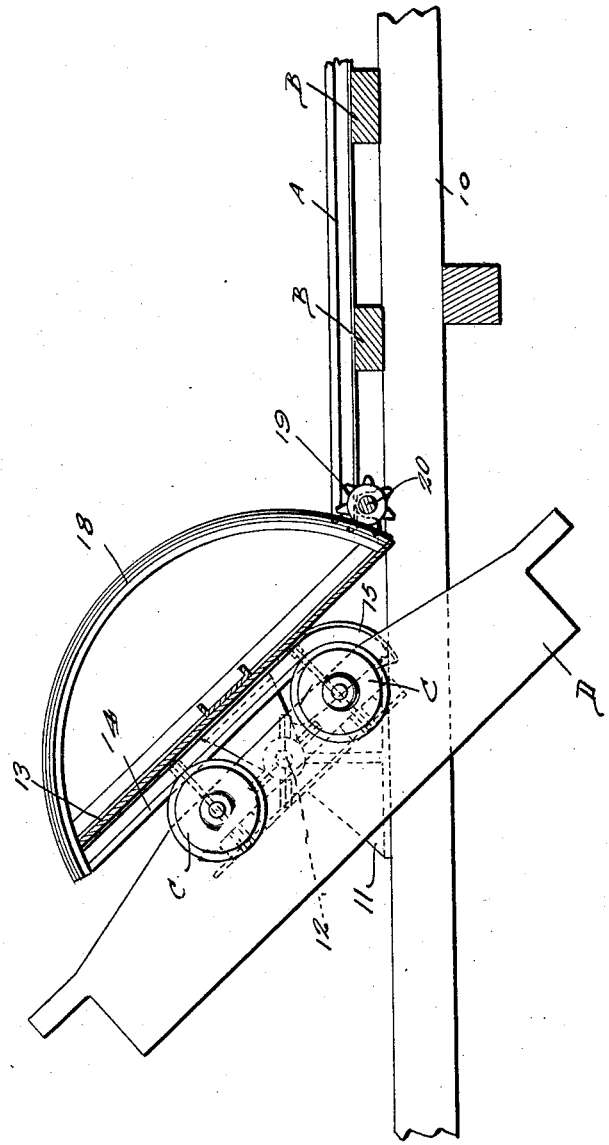
Oran Irvin INVENTOR Patented Jan. 20, 1925.

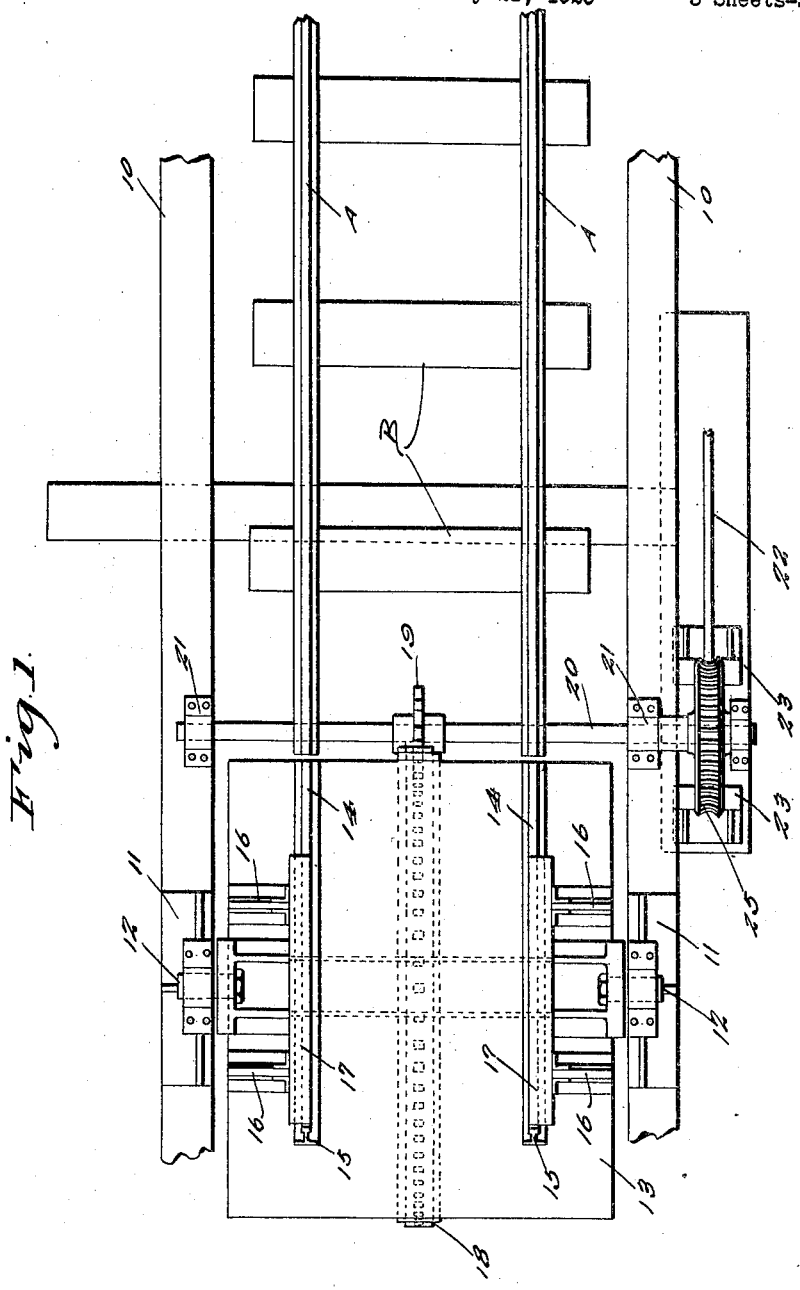

1,523,963

UNITED STATES PATENT OFFICE.

ORAN IRVIN, OF CAIRNBROOK, PENNSYLVANIA.

CAR-DUMPING DEVICE.

Application filed May 21, 1923. Serial No. 640,597.

*To all whom it may concern:*

Be it known that I, ORAN IRVIN, a citizen of the United States, residing at Cairnbrook, in the county of Somerset and State of Pennsylvania, have invented new and useful Improvements in Car-Dumping Devices, of which the following is a specification.

This invention relates to devices for dumping mine cars and the like and has for its object the provision of a novel dump device onto which the car is rolled and equipped with power driven means for tilting the car and discharging its contents.

An important object is the provision of a device of this character which will effect the dumping action at a uniform rate so that the best results will be assured, the drive means being of such a character that the action will be smooth and will not result in injury to any of the parts.

An additional object is the provision of a device of this character which will be comparatively simple and inexpensive in manufacture, easy to install and operate, a great time and labor saver and a general improvement in the art.

With the above and other objects and advantages in view the invention consists in the details of construction to be hereinafter more fully described and claimed and illustrated in the accompanying drawings, in which:

Figure 1 is a plan view of the device with parts broken away,

Figure 2 is a rear elevation,

Figure 3 is a side elevation,

Figure 4 is a longitudinal section with the device shown in dumping position,

Figure 5 is a detailed section.

Referring more particularly to the drawings the numeral 10 designates the side bars of a suitable frame which is located at one end of a track which includes rails A carried by ties B. Secured upon and rising from these frame bars 10 are bearings 11 within which are journaled trunnions 12 projecting laterally from a platform 13 which is thus capable of swinging movement in a vertical plane. On this platform are rails 14 which align with the rails A and which have upturned ends 15 adapted to be engaged by the wheels C of a dump car D rolled onto the rails 14 from the track. Rising from the platform outwardly of the tracks 14 thereon are upstanding brackets 16 to which are secured guards 17 constructed preferably of angle iron which guards are so positioned as to overlie the car wheels C for preventing the car from slipping off or moving when the dumping is effected by tilting the platform.

Secured upon the underside of the platform is an arcuate rack 18 with which meshes a pinion 19 carried by a shaft 20 which extends across the main frame and which is journaled in bearings 21. Journalled longitudinally of and to one side of the frame is a shaft 22 supported in suitable bearings 23 and carrying a worm 24 which meshes with a worm wheel 25 on the shaft 20. The shaft 22 is of course driven by any suitable motor or engine and the transmission therefor may be of any preferred type and is therefore not illustrated.

In the operation the car to be dumped is rolled on to the tracks 14 on the platform 13, the wheels engaging against the curved upstanding ends 15 of the tracks and extending below but close to the guard rails 17. Power is then applied to the shaft 22 and from this shaft motion is imparted to the shaft 20 and gear 19. Rotation of the gear in mesh with the rack 18 causes the platform 13 carrying the car to be tilted on its trunnions 12 so that the car will be almost inverted as indicated in Figure 4. On reaching or approaching such a position it is quite obvious that the contents of the car will be dumped. By reversing the rotation of the shaft 22 the platform and car will be returned to initial position and the car may be run off from the platform onto the tracks A and to any place desired where it will recive another load.

From the foregoing description and a study of the drawings it is apparent that I have thus provided a simply constructed dump which is well adapted for handling mine or other cars for effecting dumping thereof in an expeditious and satisfactory manner. Owing to the simplicity of the construction and the fewness of the parts it is apparent that there is little to get out of order so that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

A dumping device of the character described comprising the combination with a trackway including rails, of horizontally extending spaced sills, upstanding bearing members mounted on the sills, a platform located between the sills and carrying rails aligning with the first named rails and adapted to have a card run thereonto, curved top members at the ends of the second named rails adapted to be engaged by the wheels of a car for limiting movement thereof, standards carried by the platform and pivoted at said first named bearings, upstanding supports mounted on the platform and carrying horizontally disposed angle bars overlying the wheels of the car for holding the car in a certain fixed position, an arcuate rack mounted on the underside of the platform, a shaft journaled transversely of the platform and carrying a pinion meshing with said rack, and gear mechanism for turning said last named shaft.

In testimony whereof I affix my signature.

ORAN IRVIN.